United States Patent [19]
Rose et al.

[11] Patent Number: 5,788,266
[45] Date of Patent: Aug. 4, 1998

[54] SIMPLIFIED AIRBAG MODULE HOUSING

[75] Inventors: Larry D. Rose, Layton, Utah; Donald J. Paxton, Romeo, Mich.

[73] Assignee: Autoliv ASP, Inc., Ogden, Utah

[21] Appl. No.: 715,278

[22] Filed: Sep. 16, 1996

[51] Int. Cl.⁶ ................................................. B60R 21/16
[52] U.S. Cl. ........................................ 280/728.2; 280/732
[58] Field of Search ............................. 280/728.2, 732

[56] References Cited

U.S. PATENT DOCUMENTS

| | | | |
|---|---|---|---|
| 4,944,527 | 7/1990 | Bishop et al. | 280/741 |
| 4,964,654 | 10/1990 | Bishop et al. | 280/743 |
| 5,149,130 | 9/1992 | Wooley et al. | 280/743 |
| 5,340,147 | 8/1994 | Fontecchio et al. | 280/728.2 |
| 5,398,958 | 3/1995 | Taggart | 280/728.2 |
| 5,533,750 | 7/1996 | Karlow et al. | 280/728.2 |
| 5,542,691 | 8/1996 | Marjanski et al. | 280/728.2 |

*Primary Examiner*—Kenneth R. Rice

[57] ABSTRACT

A simplified airbag module assembly includes three unique features. These comprise a retainer tube with an anchor tab, a module housing with an attachment flange, and an airbag with a button hole for the anchor tab. Only two fasteners are required to complete the module assembly.

16 Claims, 4 Drawing Sheets

Typical Extruded Aluminum Hsg.
5 Fasteners

Typical Steel Hsg.
17 Fasteners

STEP 1

SLIDE RETAINER INTO CUSHION AND INSERT TAB THRU BUTTON HOLE

STEP 2

INSERT RETAINER TUBE/CUSHION ASSEMBLY INTO MODULE HOUSING AND SECURE WITH FASTENER

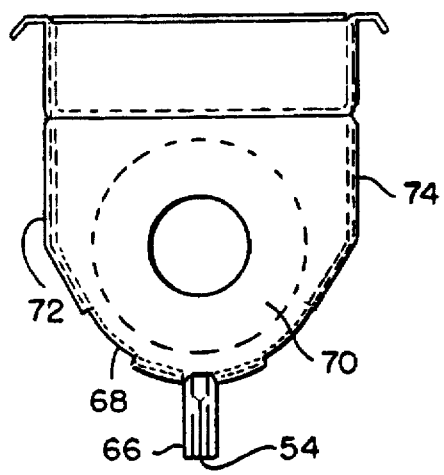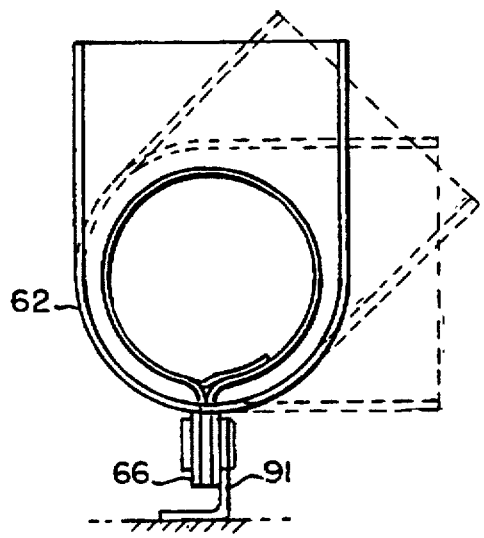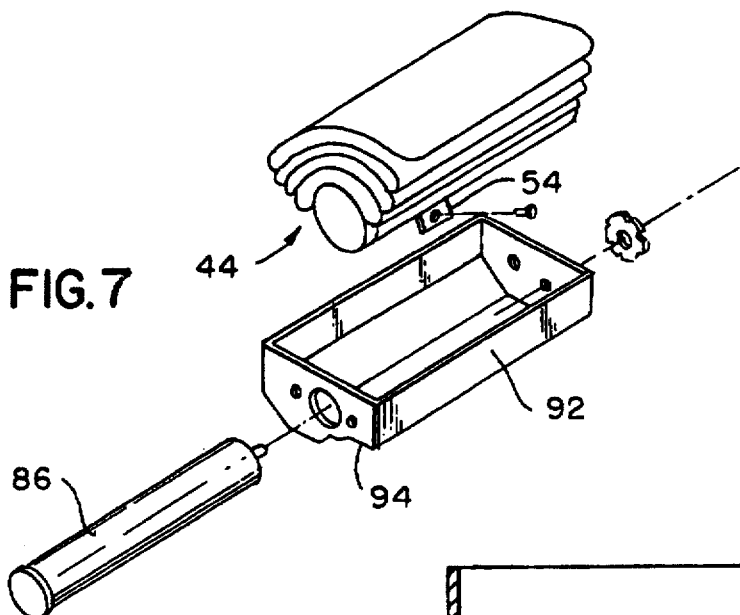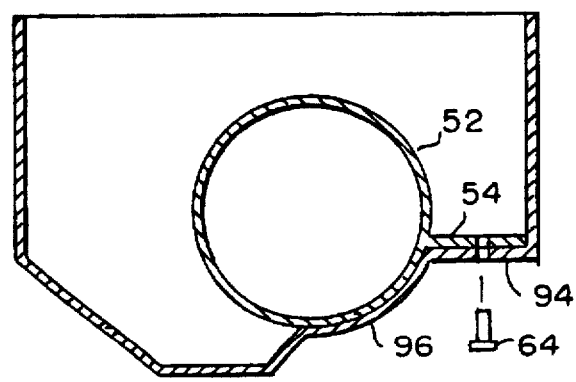

FIG. 9
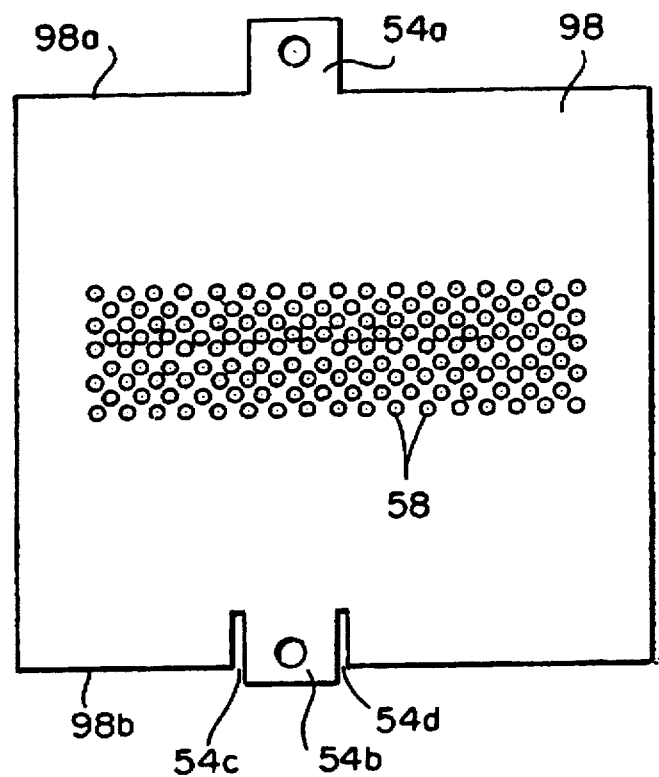
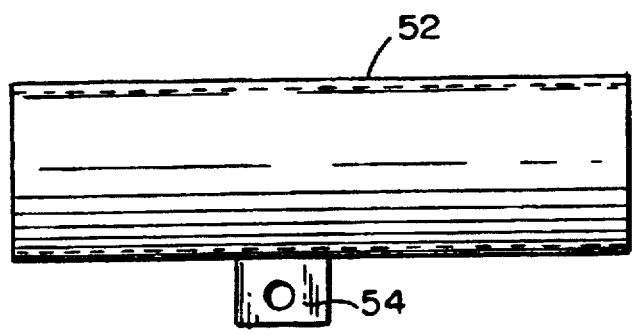
FIG. 10
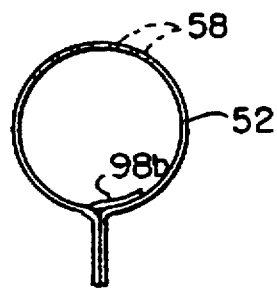
FIG. 11

5,788,266

SIMPLIFIED AIRBAG MODULE HOUSING

BACKGROUND OF THE INVENTION

1. Field of the Invention

The present invention is a simplified airbag module housing which is useful in motor vehicle inflatable restraint systems and is particularly suited for stamped steel construction.

2. Description of the Related Art

Motor vehicle inflatable restraint systems typically include a crash sensor suitably mounted on the vehicle frame and an airbag system or assembly positioned within the vehicle passenger compartment. The airbag assembly generally includes an inflatable cushion and a gas generator, which, respectively, are commonly called an airbag and an inflator. The inflator is a type responsive to a control signal produced by the crash sensor and provides gas to inflate and deploy the airbag upon a sudden vehicular deceleration, sensed by the crash sensor, that is indicative of the onset of a crash.

Also included in the airbag assembly is an outer reaction canister or module housing in which the airbag and inflator are contained. The module housing is a structurally sound member which supports the weight of the folded airbag and the inflator and absorbs and retransmits the airbag deployment forces to the vehicle.

The airbag typically has a section that defines a gas inlet opening for receiving the generated inflating gas upon activation of the inflator. High loads, that is great amounts of force, are inserted on the airbag and the module housing particularly during the initial stage of inflator activation inflation snap of the airbag. Because of this, secure coupling of the airbag to the module housing is important.

It is generally desirable to reduce the number of fasteners in an airbag system or assembly. Typically, a passenger airbag module such as the prior art extruded aluminum module housing shown in FIG. 1 is assembled using a plurality of fasteners. The assembly 10 of FIG. 1 includes a reaction canister 12, an inflator 14, a reaction canister body part 16, end caps 18a and 18b, a folded airbag 20, a diffuser plate 22, and a nut 24. A circular opening 26 is provided in end cap 18a and a smaller keyed opening 28 is provided in the end cap 18b A flange 30 is provided on one end of the inflator 14 and a threaded key stud 32 is provided on the other end thereof. The size of the opening 28 of the end cap 18b is such as to allow the inflator stud 32 to be inserted therein with the inflator flange 30 mating with the opening 26 in the end cap 18a. The diffuser plate 22 supports the folded airbag 20. The open mouth of the airbag 20 is restrained by dowels 34. The nut 24, which is screwed on the stud 32 of the inflator 14, and four fasteners, which attach the end caps 18a and 18b to the reaction canister 12, hold the assembly together. Thus, in FIG. 1 a total of five (5) fasteners are employed to hold the assembly together.

There are many situations where it is desirable to surround the inflator, which is positioned within the module housing, with a retainer tube to help control gas flow to the airbag, contain the pressure, and protect the airbag. The aluminum extruded housing airbag module construction shown in FIG. 1 addresses these problems by utilizing airbag retainer channels and hollow sections. There are many situations, however, where it may be desirable or cost effective to use a stamped steel module housing, such as the prior art typical steel housing assembly shown in FIG. 2.

The assembly of FIG. 2 includes a stamped steel reaction canister 36, an inflator 38, an airbag 40, and an airbag retaining ring 42. Seventeen (17) fasteners are utilized in the assembly of FIG. 2. Most of the fasteners are required for the attachment of the airbag 40 to the reaction canister 42.

There exists a need and a demand for improvement in the construction and assemblage of airbag module housings to reduce the technological gap that exists in respect of the number of fasteners that are required in the assembly of extruded aluminum and stamped steel airbag module housings.

SUMMARY OF THE INVENTION

It is an object of the invention to provide a simplified airbag module housing arrangement.

Another object of the invention is to provide a simplified airbag module arrangement that is particularly suited for stamped steel construction.

A further object of the invention is to provide a stamped steel airbag module housing arrangement that is simple, inexpensive, reliable and easy to assemble.

The invention consists of three unique features: a retainer tube with an anchor tab, a module housing with an attachment flange, and an airbag constructed with a button hole for the anchor tab. Only two fasteners are required to complete the module assembly.

The retainer tube is circular or elliptical in shape and is formed from a single flat pattern of planar metal sheet. The retainer tube retains the airbag while under inflation and bears the high loads that are generated during the initial stage of inflator actuation. The retainer tube houses the inflator and functions as a generated gas management tool by containing the initial gas discharge pressure and/or redirecting the flow of the gas. The retainer tube further acts as a barrier, protecting the airbag from he hot generated gas.

A key feature of the invention is the anchor tab which protrudes from the retainer tube and is used to join the retainer tube to the module housing. The anchor tab also prevents the airbag from rotating under load on the retainer tube. The anchor tab typically is offset to one side to control the airbag to module housing orientation.

The module housing attachment flange, a unique feature of the invention, consists of two legs each of which extend from a respectively associated sidewall of the housing. The legs are specially formed to receive the anchor tab and are typically spot welded together to maintain the rigidity of the module housing.

The attachment flange is a stiff member that will carry the airbag loading forces that are transmitted through the anchor tab. The attachment flange can be located in any radial position within a 180 degree arc corresponding to the back half of the module housing.

The attachment flange, as described, can be omitted under special circumstances. In such a case, the anchor tab would be attached parallel to the sidewall of the module housing.

In accordance with the invention, the airbag is constructed to receive the retainer tube. The construction of the airbag, in this respect, can be simplified to one main loop with a button hole and two side panels. Since the airbag loops around the retainer tube, loading is distributed and fabric stresses at initial deployment of the airbag are minimized. If an internal tether is required, additional tabs could be added to the anchor tab side of the retainer tube to help resist airbag rotation of the tube.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which preferred embodiments of the invention are illustrated.

BRIEF DESCRIPTION OF THE DRAWINGS

With this description of the invention, a detailed description follows with reference being made to the accompanying figures of drawing which form part of the specification and of which:

FIG. 5 is a cross-sectional view taken along the lines 5—5 of FIG. 4;

FIG. 6 is a cross-sectional view illustrating the use of the attachment flange on the module housing and the primary airbag module to vehicle attachment;

FIG. 7 illustrates an assembly view of an alternate embodiment of the invention;

FIG. 8 is a cross-sectional view of the module housing of FIG. 7 illustrating the attachment of the retainer anchor tab internally of the module housing and parallel to the module housing side wall;

FIG. 9 is a detail drawing illustrating a planar view of a retainer tube according to the invention;

FIG. 10 illustrates a front plan view of the formed retainer tube; and

FIG. 11 is a plan end view of the retainer tube shown in FIG. 2.

DESCRIPTION OF THE PREFERRED EMBODIMENTS

Figure 1:
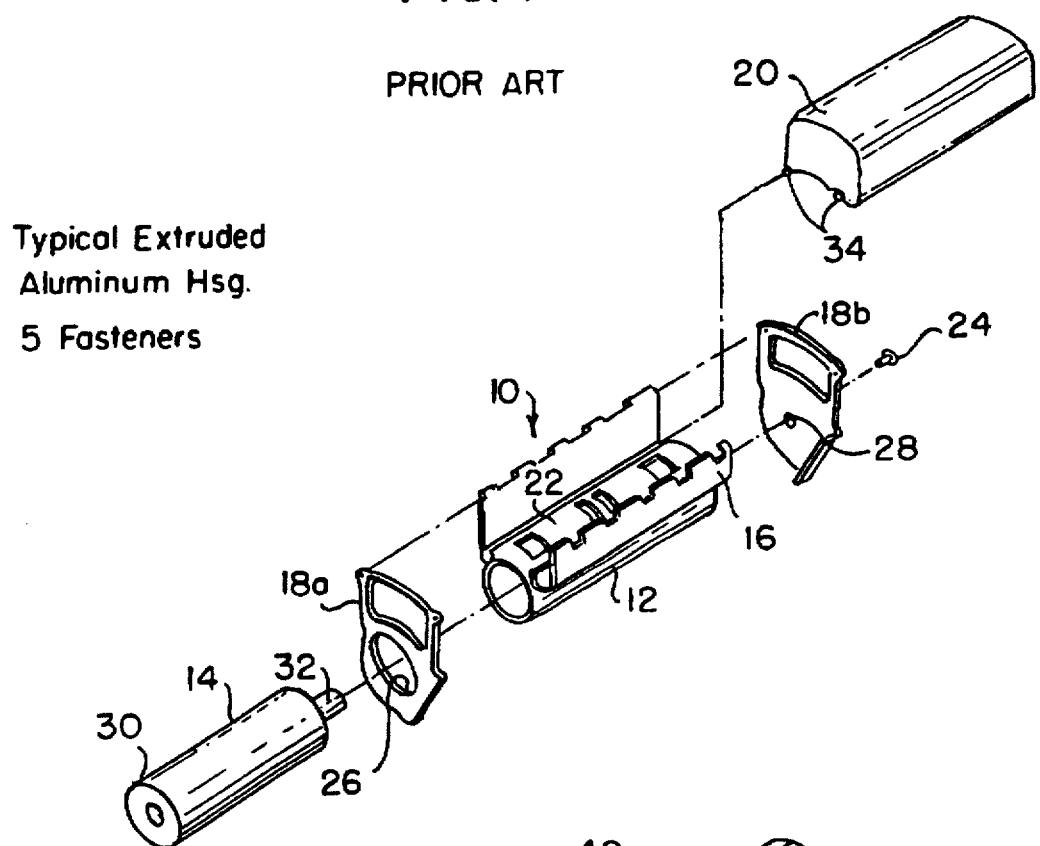
FIG. 1 is illustrative of a prior art airbag extruded aluminum module housing assembly.
Figure 2:
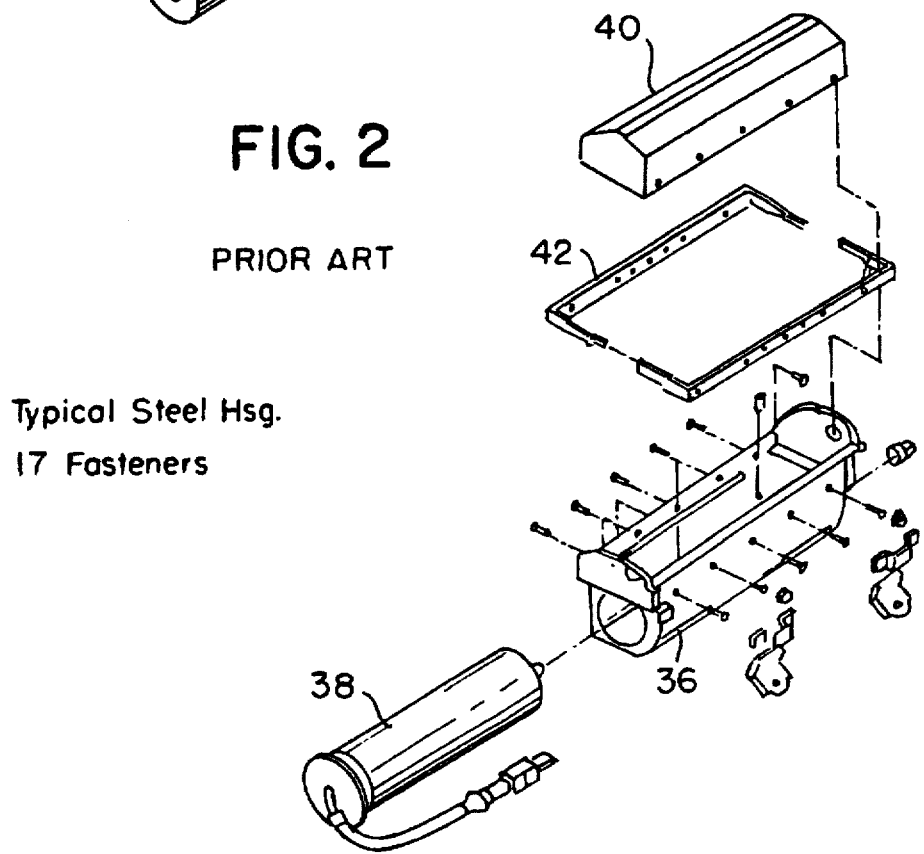
FIG. 2 is illustrative of a prior art stamped steel airbag module housing assembly.
Figure 3:
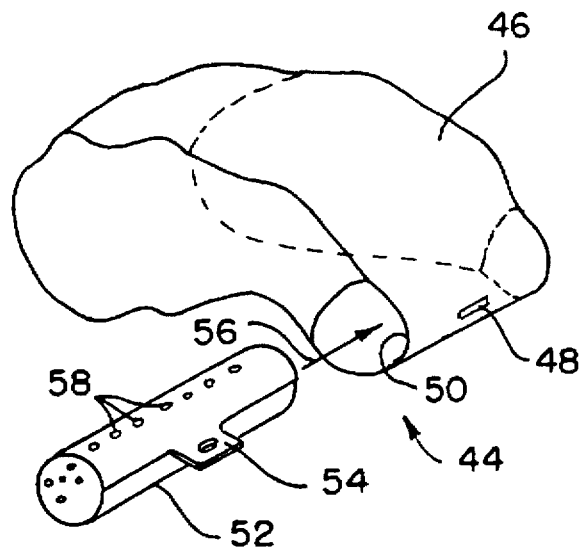
FIG. 3 illustrates an assembly view of the airbag and the retainer tube of the the present invention.

There is illustrated in FIG. 3 a first step in the assembly sequence of an exemplary airbag module according to the invention. The assembly 44 includes an airbag 46 having an intermediately positioned button hole 48 formed in a cylindrical loop 50 at one end thereof, and a hollow cylindrical generally circular retainer tube 52 that is open at each end. The retainer tube 52 includes an anchor tab 54 that protrudes outwardly from the peripheral surface of the retainer tube 52 at a position that is intermediate of the length thereof. The retainer tube 52, as indicated by the arrow 56 in FIG. 3, is inserted in sliding relation into the loop 50 of the airbag 46, with the anchor tab 54 protruding outwardly through the button hole 48. The size of the loop 50 is such as to enable the retainer tube 52 to fit snugly therein.

The retainer tube 52 in the completely assembled airbag module houses an inflator and includes a plurality of apertures 58 that face inwardly of the airbag 46 to permit gas generated by the inflator to enter and inflate the airbag 46. The apertures 58 are on a side of the retainer tube 52 that is distal or remote from the anchor tab 54.

The airbag 46 is constructed to receive the retainer tube 52. The airbag construction is simplified to one main loop with the button hole 48 and two side panels. Since the airbag 46 loops around and envelops the retainer tube 52, loading is distributed and fabric stresses at airbag snap at inflation are minimized. If an internal tether were required, additional tabs could be added to anchor tab side of the retainer tube to help resist cushion rotation of the tube 52.

Figure 4:
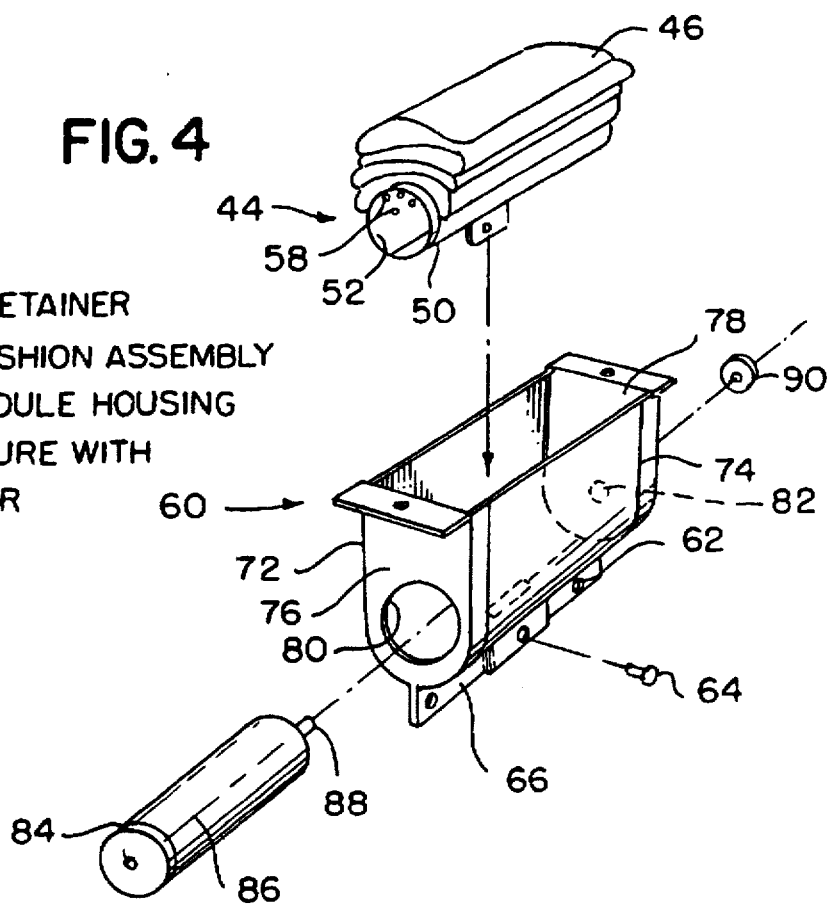
FIG. 4 illustrates an assembly view of components comprising an embodiment of the present invention.

In FIG. 4 there is shown a second step in the assembly sequence of an airbag module in accordance with the invention. The assembly 60 in FIG. 4 includes the retainer tube/airbag assembly 44 shown in FIG. 3. In FIG. 4, however, the retainer tube 52 is shown inserted in the loop 50 of the airbag 46. Additionally, the airbag 46 is folded neatly in a compacted or stored condition, proximate the side of the retainer tube 52 that contains the apertures 58.

The assembly 60 also includes a module housing 62 having an attachment flange 66 formed on the surface of the back thereof and sidewalls 72 and 74. The module housing 62 is a container into which the assembled retainer tube/airbag assembly 44 is received and positioned and secured therein by fastening by means of a first fastener 64 the anchor tab 54 to the attachment flange 66 of the module housing 62. The first fastener means 64 may comprise a nut and a bolt.

The attachment flange 66 of the module housing 62 consists of two legs 68 and 70 that extend downwardly from the back of the module housing 62, as best seen in FIG. 5, from a respectively associated sidewall 72 and 74. The legs 68 and 70 are specially framed to receive the anchor tab 54 and typically are spot welded together to maintain rigidity of the moldule housing 62.

The attachment flange 66 is a stiff member that will carry the heavy loading forces that are transmitted through the anchor tab 54 upon snap inflation and deployment of the airbag 46.

In addition to the sidewalls 72 and 74, the module housing 52 includes end caps 76 and 78. A circular opening 80 is provided in end cap 76 and a smaller keyed opening 82 is provided in the end cap 78. A flange 84 is provided on one end of an inflator 86 and a threaded key stud 88 is provided on the other end thereof. The size of opening 82 in the end cap 78 is such as to allow the stud 88 on one end of the inflator to be inserted therein with the flange 84 on the other end of the inflator mating with the opening 80 in the end cap 76.

A third step in the assembly sequence of the airbag module 60 in accordance with the invention is to insert the inflator 86 in the retainer tube 52 and to secure the inflator 86 therein with a fastener. This is accomplished by attaching a fastener, specifically screwing a nut 90 on the stud 88 of the inflator that protrudes through the opening 82 in the end cap 78.

Thus, the assembly of the airbag module 60 according to the invention that is illustrated in FIG. 4 requires only two fasteners, the fastener 64 for attaching the anchor tab 54 to the attachment flange 66, and the fastener 90 for securing the inflator 86 in the retainer tube 52 and the module housing 62.

The retainer tube 52 and module housing 62 typically would be constructed of mild steel or aluminum. The retainer tube 52 could also be .constructed of aluminum through the extrusion process.

In accordance with the invention, as shown in FIG. 6, the attachment flange 66 on the module housing 62 can also function as a primary airbag module to vehicle attachment feature. That is to say, the attachment flange 66 of the module housing 62 can be directly attached, as by a suitable bracket 91, to the vehicle frame. Note, additionally, as indicated by the dotted line configuration in FIG. 6, that the attachment flange 66 can be located in any radial position within a 180 degree arc corresponding to the back half of the module housing 62.

Thus, the attachment flange 66 of the module housing 62 functions as a means for controlling the direction in which the airbag 46 expands. The attachment flange 66, as described, can be omitted under special circumstances. In such a case the anchor tab 54 would be attached parallel to the module housing sidewall 94, as illustrated in FIGS. 7 and 8.

The assembly view of the alternate embodiment of the invention shown in FIG. 7 includes a retainer tube/airbag assembly 44 and an inflator 86 that may be the same as the correspondingly numbered assembly components shown in FIG. 4. In FIG. 7, however, there is shown a module housing 92 that is different from the module 62 of FIG. 4. The module housing 92 is different in two respects from the module housing 62. First, the attachment flange 66 has been omitted. Secondly, the anchor tab 54 of the retainer tube 52 is attached internally of the module housing 92 parallel to the sidewall 94 thereof. The sidewall 94, as best seen in FIG. 8, is planar and horizontally disposed. The width of the sidewall 94 is sufficient to accommodate the placement thereon of the anchor tab 54. Additionally, immediately adjacent the sidewall 94 toward the central region of the module housing 92 is a proximate section of curved sidewall 96 that matches the curvature of the retainer tube 52. The attachment by a fastener of the anchor tab 54 in parallel relation to the horizontal sidewall 94 results in supporting engagement of the curved sidewall 96 by the retainer tube 52. This provides a secure and solid attachment of the retainer tube/airbag assembly 44 within the module housing 92.

FIG. 9 is a planar view of the integral airbag/inflator barrier, that is, the retainer tube 52.

The retainer tube 52 shown in FIG. 9 comprises a substantially planar metal sheet 98 having formed therein a plurality of apertures 58 disposed on elongated path and anchor tab sections 54a and 54b. The anchor tab section 54a juts out from an edge 98a of the metal sheet 98 that is parallel to the elongated path of apertures 58. The anchor tab section 54b is located at the opposite edge 98b of the metal sheet 98. The section 54b is formed by slots 54c and 54d that are cut into the metal sheet edge 98b.

When the planar sheet is rolled about itself the anchor tab sections 54a and 54b are placed in overlapping engagement, as shown in FIGS. 10 and 11. A portion of the metal sheet edge 98b defined by the slots 54c and 54d extend inwardly of the rolled sheet, as best seen in FIG. 11.

Thus, in accordance with the invention, there has been provided a simplified airbag module housing arrangement, an arrangement that is particularly suited for stamped steel construction and that is simple, inexpensive, reliable, easy to assemble, and requires only two (2) fasteners.

With this description of the invention in detail, those skilled in the art will appreciate that modifications may be made to the invention without departing from the spirit thereof. Therefore, it is not intended that the scope of the invention be limited to the specific embodiments that have been illustrated and described. Rather, it is intended that the scope of the invention be determined by the scope of the appended claims.

What is claimed is:

1. An assembly comprising:
   a retainer tube having a side that contains at least one aperture and into which retainer tube generator means may be inserted, said generator means being of the type responsive to a control signal, for generating gas to inflate an airbag means,
   inflatable means responsive to the gas, for protecting, when activated, an occupant of a vehicle, comprising an airbag, a portion of said airbag being disposed in a compacted or stored condition prior to deployment proximate said side of said retainer tube that contains at least one aperture,
   said retainer tube including an anchor tab that protrudes outwardly from a side thereof remote from said at least one aperture at a position that is intermediate the length of said retainer tube,
   said airbag including a loop having an intermediately positioned button hole,
   said loop enveloping said retainer tube with said anchor tab protruding outwardly through the button hole in said loop.

2. The assembly as defined in claim 1 wherein said airbag in addition to said loop and said button hole includes two side panels.

3. The assembly as defined by claim 1 wherein said retainer tube is made of mild steel.

4. The assembly as defined by claim 1 wherein said retainer tube is made of aluminum.

5. The assembly as defined by claim 1 including a module housing for receiving an assembled retainer tube and airbag, and wherein a portion of said module housing functions as a means for assisting in controlling the direction in which the airbag expands.

6. The assembly as defined by claim 1 including a module housing for receiving an assembled retainer tube and airbag wherein said module housing comprises first and second sidewalls and two legs each of which extend from a respectively associated one of said sidewalls and are especially formed as an attachment flange to receive said anchor tab of said retainer tube, and further including
   first fastening means attaching said anchor tab to said attachment flange.

7. The assembly as defined by claim 6 wherein said first fastening means comprise a nut and a bolt.

8. The assembly as defined by claim 6 wherein said two legs forming said attachment flange are spot welded together to maintain rigidity of said module housing.

9. The assembly as defined by claim 6 wherein said module housing includes first and second end caps with said first end cap including a circular opening and said second end cap including a smaller keyed opening, and
   wherein said generator means is cylindrically shaped having a flange at one end and a threaded key stud at the other end, the size of the opening in said second end cap being such as to allow said threaded key stud to be inserted therein with the flange on the other end of said generator means mating with said opening in said first end cap, and further including,
   second fastening means to fasten said threaded key stud of said generator means in the opening of said second end cap.

10. The assembly as defined by claim 9 wherein said second fastening means comprises a nut.

11. The assembly as defined by claim 9 wherein said retainer tube and said module housing are each made of mild steel.

12. The assembly as defined by claim 6, further including a bracket, wherein said attachment flange of said assembly is directly attached to the frame of a vehicle by said bracket.

13. The assembly as defined by claim 1 including a module housing for receiving an assembled retainer tube and airbag wherein said module housing wherein said module housing includes a sidewall having a planar section and a proximate curved section that respectively match the configuration of said anchor tab and the immediately adjacent curved section of said retainer tube, and further means including, first fastening means attaching said anchor tab to said sidewall planar section with a proximate curved section of said retainer tube engaging said sidewall proximate curved section.

14. The assembly as defined by claim 13 wherein said first fastening means comprises a nut and a bolt.

15. The combination as defined by claim 13 wherein said module housing includes first and second end caps with said first end cap including a circular opening and said second end cap including a smaller keyed opening, wherein said generator means is cylindrically shaped having a flange at one end and a threaded key stud at the other end, the size of the opening in said second endcap being such as to allow said threaded key stud to be inserted therein with the flange on the other end of said gnerator means mating with said opening in said first end cap, and further including, second fastening means to fasten said threaded key stud of said generator means in the opening of said second end cap.

16. The assembly as defined by claim 15 wherein said second fastening means comprises a nut.

* * * * *